United States Patent [19]
Spier

[11] 3,958,291
[45] May 25, 1976

[54] OUTER SHELL CONSTRUCTION FOR BOOT AND METHOD OF FORMING SAME

[76] Inventor: I. Martin Spier, 50 Park Ave., New York, N.Y. 10016

[22] Filed: Oct. 18, 1974

[21] Appl. No.: 516,044

[52] U.S. Cl. .............................. 12/142 RS; 264/244
[51] Int. Cl.² ...................... A43D 9/00; A43D 65/00
[58] Field of Search ................. 36/2.5 R, 2.5 AL, 1; 12/142 R, 142 E, 142 RS; 264/244, 267

[56] References Cited
UNITED STATES PATENTS

| | | | |
|---|---|---|---|
| 3,325,920 | 6/1967 | Werner et al. | 36/2.5 AL |
| 3,521,385 | 7/1970 | Dalebout | 36/2.5 AL |
| 3,718,994 | 3/1973 | Spier | 36/2.5 AL |
| 3,744,161 | 7/1973 | Herunter | 36/2.5 AL |

*Primary Examiner*—Patrick D. Lawson
*Attorney, Agent, or Firm*—Blum, Moscovitz, Friedman & Kaplan

[57] ABSTRACT

An outer shell construction particularly suited for a ski boot and method for forming same is provided. The outer shell construction is formed by the steps of injection molding an outer shell, and securing a collapsible core to the inside of the boot to define a cavity between the boot and the collapsible core. The collapsible core includes a conduit therethrough. The outer shell construction is completed by introducing a cellular polymer in viscous form through the conduit into the space and curing same.

7 Claims, 4 Drawing Figures

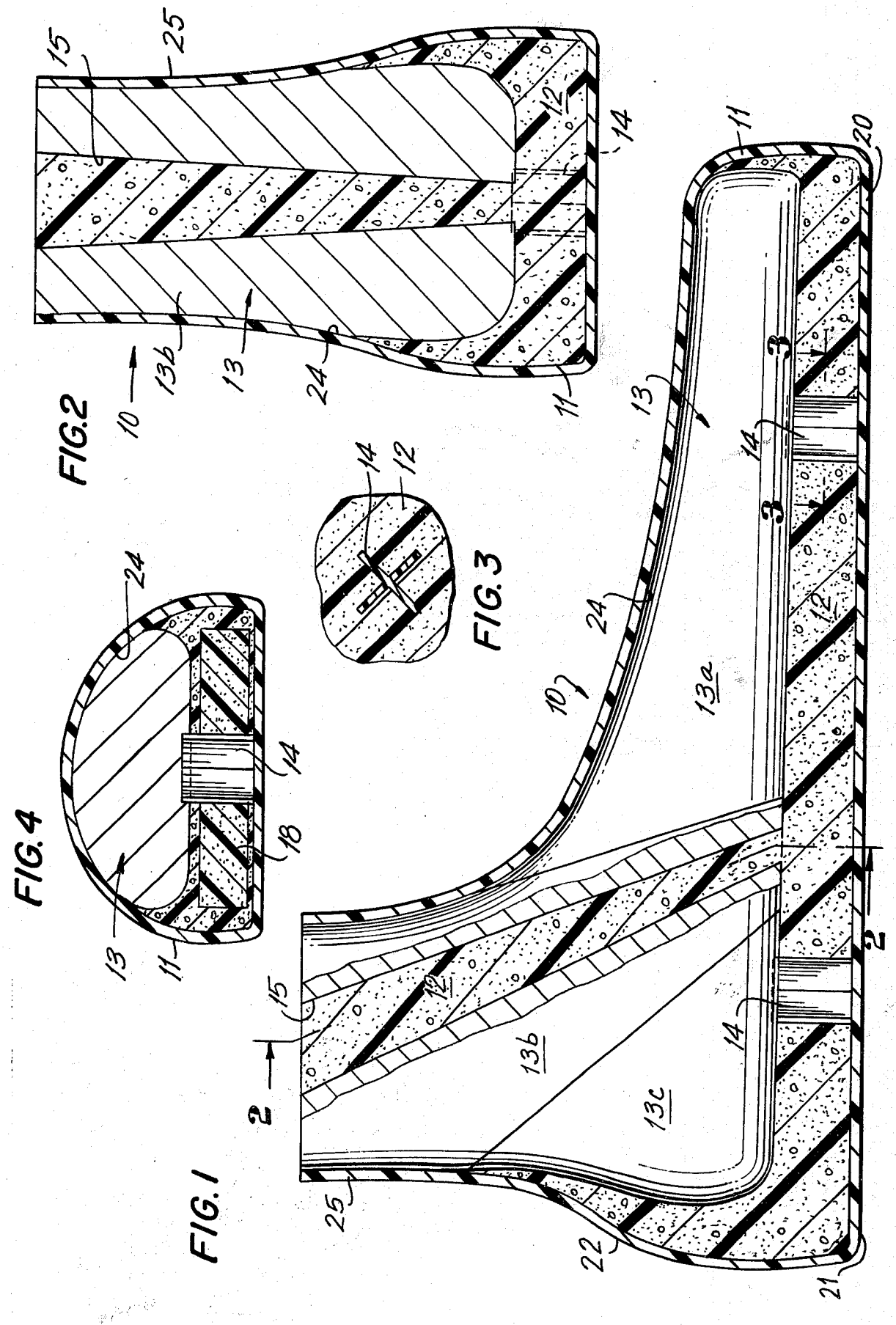

OUTER SHELL CONSTRUCTION FOR BOOT AND METHOD OF FORMING SAME

BACKGROUND OF THE INVENTION

This invention relates generally to an improved outer shell construction for a boot and method of fabricating same, and in particular to an outer shell construction for use in a ski boot. In recent years, plastics have replaced leather in the outer shell construction of ski boots. Because boots and outer shell boot constructions fabricated of plastic materials admit of the desired flexing characteristics yet offer the requisite rigidity needed to endure extended use, such plastic boots have gained instant popularity.

One such boot is disclosed in U.S. Pat. No. 3,718,994, issued on Mar. 6, 1973. An outer shell construction is presented therein which is formed of inner and outer shell portions having different stiffness, rigidity, flexibility and wear-resistant characteristics. The outer shell construction is fabricated by first molding the inner shell portion and thereafter molding the outer shell portion about the inner shell portion. Although ski boots manufactured in accordance with the above-noted patent provide the skier with ski boots having good flexibility and the necessary rigidity, other fabrication techniques and article constructions are also possible.

SUMMARY OF THE INVENTION

Generally speaking, in accordance with the invention, an outer shell construction for a boot and method for making same is provided therein. The method includes the steps of injection molding an outer shell and inserting a collapsible core inside the boot to define a cavity between the boot and the collapsible core. The collapsible core includes a conduit therethrough. The outer shell construction is completed by introducing a cellular polymer in viscous form through said conduit into said cavity and curing same, the resulting injection-molded outer shell and cured cellular polymer inner shell defining an improved outer shell construction.

Accordingly, one object of this invention is to provide an improved outer shell construction for a ski boot and method for forming same.

Another object of this invention is to provide an improved lightweight outer shell construction for a ski boot.

Still another object of this invention is to provide an improved method of fabricating a lightweight outer shell construction for a boot.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an elevational section view of an outer shell construction being fabricated in accordance with the preferred embodiment of the instant invention;

FIG. 2 is a sectional view taken along line 2—2 of FIG. 1;

FIG. 3 is a partial sectional view taken along line 3—3 of FIG. 1; and

FIG. 4 is a partial sectional view of an alternate embodiment of the instant invention taken at the sole portion.

DESCRIPTION OF THE PREFERRED EMBODIMENT

This invention is concerned with what is generally known as the outer shell construction of a ski boot. The outer shell construction is that which forms the outside of the boot, provides the strength and rigidity required of a ski boot, and carries the closures, generally in the form of buckles, for properly securing the boot on the foot of the wearer. The outer shell, as is known to those skilled in the art, is provided with an inner liner having appropriate padding and contours to generally conform to the wearer's foot for proper fitting. Leather, fleece, foam, plastic and other suitable materials have been used to form the liner of the ski boot. However, the description hereafter will be directed to the outer shell of the boot as it is the outer shell with which the invention is concerned. Thus, for simplicity, the drawings wholly omit the inner or foot-conforming liner of the shell.

Reference is now made to FIGS. 1 through 3, wherein an outer shell construction, generally indicated as 10, is illustrated during fabrication thereof. The outer shell construction consists of an injection-molded outer shell 11 and inner shell 12 formed of cured cellular polymer formed in a manner to be hereinafter described in greater detail. The outer shell 11 opens at the front in a conventional manner generally along the instep and front of the ankle and is closed by a plurality of buckles (not shown). A collapsible last generally indicated as 13 is mechanically and chemically mounted on locating lugs 14 so as to allow the last 13 to be easily released from the lugs. The last 13 includes a conduit 15 which communicates with the space defining the inner shell 12 and provides an opening for introducing a cellular polymer in viscous form into the cavity between last 13 and outer shell 11 to form the inner shell 12. Last 13 is comprised of a three-part collapsible core including wedges 13a, 13b, and 13c, removal of wedge 13b, causing the outer wedges 13a and 13c to be easily removed from the outer shell construction.

As is hereinafter described in greater detail, the last 13 is only utilized to fabricate the outer shell construction, whereafter the last is collapsed and removed from the boot. Thus the last, although an essential element in the fabricating of the outer shell construction, does not constitute any part of the outer shell construction constructed in accordance with the instant invention.

The outer shell 11 is formed first by any suitable molding techniques such as injection molding. The outer shell portion 11 imparts strength, stiffness and flexibility to the outer shell construction. A material having good flexibility and abrasion resistance is selected for outer shell portion 11, such as polyurethane or other elastomeric materials. Referring specifically to FIG. 1, outer shell portion 11 includes a sole 20, a heel 21, a back 22, a toe 23, vamps 24 and ankle-covering portion 25. Outer shell portion 11 is formed by placing a form or core in a mold cavity and, by utilizing injection-molding techniques, injecting the polyurethane into the mold cavity to form the outer shell portion 11. The ski boot closures, and in particular the buckles (not shown), are then secured to the outer shell portion 11.

Thereafter, collapsible last 13 is inserted into the molded outer shell portion 11 and is secured to locating lugs 14 to define a cavity between the last 13 and the outer shell 11. The last is further secured to the outer shell portion 11 at the ankle portion 25 by the closure clamps thereof to form a seal at the ankle portion and define a closed cavity with the exception of the opening provided by longitudinal conduit 15 formed in last 13. Thereafter, a cellular polymer in viscous form, such as closed-cell polyurethane having a range of densities of 0.1 to 6.0, is introduced into the cavity defined between the last 13 and the outer shell portion 11 and fills the entire cavity. The cellular polymer is then cured to define a lightweight inner shell 12. The last 13 is then removed from the boot construction, the collapsible core wedges 13a, 13b and 13c facilitating the removal of the last to thereby leave the outer shell construction remaining.

Reference is now made to FIG. 4, wherein an alternate embodiment is depicted. In order to further lighten the weight of the boot, a block of material 18 having a very low density by comparison to the cured closed-cell polymer can be inserted into the cavity between the last 13 and the outer shell 11 prior to insertion of the last. The block thereby becomes encapsulated in the solid closed-cell polymer after same is cured. It is noted that block 18 can be formed of such low-density materials as polystyrene, an air pillow, etc.

It is noted that the inner shell 12 can be reinforced by introducing reinforcing filaments and/or microballoon materials such as tiny glass or plastic spheres when the cellular polymer is introduced into the cavity formed between the last and the outer shell 11. The greater the density of the cellular polymer introduced into the cavity, the greater the strength thereof and also the greater the weight thereof. However, a balance is preferably struck between the greater strength achieved by increasing the specific density and the weight added thereby.

Moreover, as noted above, in order to secure a tight fit between the last 13 and the outer shell portion 11, and hence a sealing of the cavity, the boot hardware such as the closure clamps, etc., is attached to the boot prior to the introduction of the foam into the cavity. Because the viscous polymer foams utilized to form the inner shell member 12 require a minimum pressure on the order of about 1 atmosphere, it is not necessary to have the type of tight and pressure-resistant clamping seal required in injection-molded boots of the type disclosed in U.S. Pat. No. 3,718,994, discussed above.

It is further noted that by utilizing a collapsible last to fabricate the outer shell construction formed in accordance with the instant invention, it is possible to fabricate outer shell constructions having half-sizes and widths at relatively inexpensive production costs, as opposed to the great expense incurred in changing sizes in an injection-molded boot.

Finally, by forming the last so that it makes pressure contact at the ankle-covering portion 25 of the outer shell 11, the flow of foam is limited and controlled in the cavity to provide a foam-fitting contour. Also, it would be possible to alter the composition and/or specific gravity of the cellular polymer so that the sole area of the inner shell might have a lighter density of material than the material flowing up the sides of the boot. This could be easily achieved by introducing the heavier density material first, since the heavier density cellular polymer material tends to flow up the sides of the cavity and fill the higher portions first, so that the selected rigidity can be effected by the sequence in which the density of the foam is altered.

It will thus be seen that the objects set forth above, among those made apparent from the preceding description, are efficiently attained, and since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for forming an outer shell construction for a boot comprising the steps of injection molding an outer shell, releasably securing a collapsible core to the inside of said outer shell molding and spaced therefrom to define a cavity between said outer shell and said collapsible core, said collapsible core including a conduit therethrough, introducing a cellular polymer in viscous form through said conduit into said cavity and curing said cellular polymer whereby said cured cellular polymer and outer shell molding define a boot outer shell construction.

2. A method for forming an outer shell as claimed in claim 1, wherein intermediate to the forming of the molded outer shell and securing said collapsible core thereto, inserting a block having a specific density lower than said cellular polymer into said outer shell to occupy a portion of the cavity defined between the outer shell and the collapsible core.

3. A method for forming an outer shell as claimed in claim 1, wherein intermediate the steps of securing said collapsible core and introducing said cellular polymer, releasably sealing said outer shell and collapsible core whereby said cellular polymer introduced into said cavity fills up same.

4. A method for forming an outer shell construction as claimed in claim 1 and including the step of removing said collapsible core from said outer shell.

5. A method for forming an outer shell construction as claimed in claim 3 and includng the step of removing said collapsible core from said outer shell.

6. A method for forming an outer shell construction for a boot comprising the steps of injection molding an outer shell, inserting a block having a first specific density into said outer shell, securing a collapsible core to the inside of said outer shell molding and spaced therefrom to define a cavity between said outer shell and said collapsible core, said collapsible core including a conduit therethrough, said block having said first specific density occupying a portion of said cavity, and introducing a cellular polymer in viscous form having a specific density higher than said first specific density through said conduit into said cavity.

7. A method for forming a outer shell construction for a boot comprising the steps of injection molding an outer shell, releasable securing a removable core to the inside of said outer shell molding and spaced therefrom to define a cavity between said outer shell and said removable core, introducing a cellular polymer in viscous form into said cavity, curing said cellular polymer and removing said removable core whereby said cured cellular polymer and outer shell molding define a boot outer shell construction.

* * * * *